United States Patent Office

2,856,314
CELLULOSE FILM CONTAINING MODIFIED MELAMINE-FORMALDEHYDE RESIN AS ANCHOR MEDIUM

William M. Wooding, Old Greenwich, and Yun Jen, Stamford, Conn., and Edward H. Sheers, Flushing, N. Y., assignors to American Cyanamid Company, New York, N. Y., a corporation of Maine No Drawing. Application December 21, 1956
Serial No. 629,774

6 Claims. (Cl. 117—71)

The present invention relates to a method of treating sulfate-process regenerated cellulose film during its manufacture to improve its anchoring properties for subsequently applied topcoat material. The invention includes the principal process steps including application of the topcoat material as well as the film material during the respective stages of its manufacture.

Non-fibrous regenerated cellulose film is commercially manufactured by a process which commences with extrusion of viscose (cellulose xanthate) solution as a film into a bath comprising dilute aqueous sulfuric acid, wherein the viscose film is coagulated and cellulose is regenerated in non-fibrous form. In the bath, sodium sulfate is continuously formed from the caustic soda in the viscose solution. The film is then intensively washed with water and other materials such as sodium sulfide solution in an effort to desulfurize the film completely and extract all soluble salts (principally sodium sulfate), after which the film is impregnated with glycerol or other polyhydric alcohol and dried and formed into rolls. Such film is termed "sulfate process regenerated cellulose film."

Where the film is to be moisture-resistant it is customary to apply hydrophobic organic topcoat material to both sides of the film, an anchor agent being added to the plasticizing bath to improve the anchoring properties of the film and retard the sloughing which occurs on prolonged exposure of the topcoated film to moisture. It has long been known that addition of a small amount of a cationic, hydrophilic, thermosetting amine-aldehyde resin to regenerated cellulose film plasticizing baths improves the affinity or anchoring capacity of the film for subsequently baths containing applied topcoat material; and it has recently been found that melamine-formaldehyde-polyalkylenepolyamine resin is outstandingly effective for the purpose; see Wooding et al. application Serial No. 519,003, filed June 29, 1955, now U. S. Patent No. 2,796,362, and the present application represents an invention thereover. It is a disadvantage that the melamine-formaldehyde-polyalkylenepolyamine resin baths of the patent are short-lived, the resin tending to flocculate. Laboratory tests have shown this flocculation to be the result of dissolved polyvalent anions, and the evidence is that despite the intensive washing to which the film is subjected prior to treatment of trace amount of polyvalent ion material remains dissolved and is released from the film into the resin bath where it accumulates. Laboratory tests using sodium-sulfate as the polyvalent ion material have shown that dilute (0.5%–2%) aqueous solutions of the resin are flocculated by addition of less than 1% by weight of dissolved sulfate ion. Anchor resins which have flocculated have lost the major part of their value for the purpose.

The discovery has now been made that sulfate process regenerated cellulose film of excellent anchoring properties can be made by passing the film through an anchor bath containing a cationic thermosetting melamine-formaldehyde-polyalkylenepolyamine-alkanepolyol condensation product in hydrophilic form, thereby impregnating the film with the resin as anchor agent, after which the film is processed in normal manner. The anchor bath may contain a polyhydric alcohol plasticizer as is customary. We have found that in such process the baths are substantially more stable to precipitation than corresponding baths prepared from the parent resin.

The resin employed in the present invention corresponds to that obtained by reacting the melamine-formaldehyde-polyalkylenepolyamine resin of the above-identified copending application (hereinafter referred to as the "parent" resin) with a small but effective amount of a water-soluble alkanepolyol as reagent or component inhibiting precipitation of the resin by the action of the sodium sulfate which accumulates in the bath.

The invention has several particular features. First, the invention eliminates any need for deionizing the anchoring bath makeup water. Industrial water having a substantial dissolved sulfate content may be used for the purpose. Secondly, the anchor resin appears to convert to hydrophobic form on drying somewhat more quickly at any given temperature than the parent resin, and in any event is easily converted to hydrophobic form by heating at 160° F.–250° F. until the film is apparently dry. Thirdly, the cellophane contains substantially less "free" or volatilizable formaldehyde. As a result, less formaldehyde is volatilized as the film is dried on the machine, and when the film is used for wrapping purposes thereafter. Working conditions in the cellophane plant are thus improved, and the film more suitable for wrapping food and other formaldehyde sensitive materials. Fourthly, the film thus obtained has very nearly the same anchoring properties for subsequently applied topcoat material as film containing the parent resin.

More in detail, according to the invention sulfate process regenerated cellulose film in normal washed and desulfured clear gel condition is passed into an anchoring bath containing a small but effective amount of melamine-formaldehyde-polyalkylenepolyamine-alkanepolyol resin as anchor agent. Between 0.01% and 5% by weight of the resin in the bath gives significant anchoring effect, but between 0.1% and 3% of the resin is preferred as obviating the danger of using too little and the waste of using too much. The bath may and preferably will also contain 5%–15% by weight of a compatible plasticizer, and the commercially-employed water-soluble polyhydric alcohols such as glycerol, glycol, or diethylene glycol are preferred as being very soluble, strongly humectant, and non-toxic in the proportions used.

The baths may be prepared simply by dissolving the resin in requisite amounts of water at room or higher temperature, together with polyhydric alcohol plasticizer if desired. Ordinary city water may be used and deionization is not necessary. The baths yield good results over the pH range of 4–11, but are particularly useful between about pH 6 and pH 8, within which range the resin cures rapidly yet acid tendering of the film is avoided.

The film may be passed through the bath thereby impregnating the film completely. If desired however, the bath may be applied by roller or spray in place of direct impregnation, so as to permit treatment of only one side of the film.

The film may be dried at room temperature but in commercial practice is passed over steam-heated rolls at 160°–260° F. until apparently dry, i. e., dry to the touch. In either event the resin in the dry film is in hydrophobic gel form, and extended heating is advantageous to convert the resin to substantially completely thermoset condition.

The film is thereafter topcoated by application of organic topcoat material.

Amongst those water-repellent topcoats which may be used in the final treatment of the cellulosic films after they have been subjected to treatment in the resin bonding bath are those coating compositions containing as the film-forming constituent compounds such as nitrocellulose, cellulose acetate, methyl cellulose, polyethylene, deacetylated chitin, rubber, chlorinated rubber, rubber hydrochloride, ethyl cellulose, butyl methacrylate, moisture-resistant lacquers, waxes such as montan wax, beeswax, carnauba wax, and other conventional film-forming waterproofing materials. The topcoat may be a water-insoluble alkyd resin adhesive or a water-soluble adhesive to permit the laying of metal foil or organic film material so as to form a laminate structure. The topcoat is not necessarily a continuous film, and may and often does consist of printed legends, revenue stamps, or decorative matter.

Resins suitable for use in the present invention may be prepared by reacting melamine, formaldehyde and a water-soluble polyalkylenepolyamine to form a cationic thermosetting hydrophilic melamine-formaldehyde-polyalkylenepolyamine resin as generally shown in the copending application referred to above, followed by reacting the resin with a water-soluble non-ionic alkanepolyol. The reaction may be carried out by heating the resin-alkanepolyol mixture at 40°–100° C. for several hours or by maintaining the mixture at room temperature for several days or weeks, depending chiefly on the reactivity of the particular resin or alkanepolyol employed in any one instance, and the amount of alkanepolyol added.

The extent of the reaction may be readily followed as it proceeds by determining the resistance of the resin to flocculation by aqueous sodium sulfate solution as shown below, the reaction being considered substantially complete when continued subjection of the resin to reaction conditions causes only a negligible increase in the stability of the resin to sodium sulfate. It will be understood, however, that the invention includes anchoring baths containing the resin in only partially reacted form, where the amount of polyvalent anion is insufficient to require that the stabilization reaction be performed to completion.

Resins suitable for the practice of the present invention may be prepared according to the following advantageous general procedure. A reaction mixture is formed from 1 mol of melamine, 1.5 to 5 mols of formalin, and sufficient of a water-soluble polyalkylenepolyamine to supply 0.3 to 10 nitrogen atoms per melamine molecule. The mixture is heated between 30° C. and 100° C. first at an alkaline pH preferably pH 7–10, to a point beyond the methylol stage but short of the gel stage and then with sufficient additional formaldehyde to provide a total of 6 to 12 mols of free and combined formaldehyde, at an acid pH between 3 and 7, to an advanced viscosity, for example between P and S at 25% solids on the Gardner Holdt scale at 25° C., more or less. The resinous syrup thus obtained is then neutralized to inhibit further aldehyde-amine condensation, the water-soluble non-ionic alkanepolyol added, and the resin reacted with the alkanepolyol at substantial neutrality at a temperature between 20° C. and 100° C. Alternative procedures yielding similar resins will occur to those skilled in the art, and such resins are likewise useful in the practice of the present invention.

The polyalkylenepolyamines referred to are a known class of materials and include diethylenetriamine, tetraethylenepentamine, tripropylenetetramine, polyethylenimine, 3,3-iminobispropylamine and the condensation product of 3,3-iminobispropylamine with ethylenedichloride.

The water-soluble non-ionic alkanepolyols are likewise a known class of materials and include ethylene glycol the di, tri and higher ethylene glycols, glycerol, polyglycerols, and the newer petroleum base glycerols of the type of 2,3-dimethyl-4-hydroxymethyl-5-hydroxyethylpentanol.

The invention will be further illustrated by the examples which follow. These examples are specific embodiments of the invention and are not to be construed in limitation thereof. Parts are by weight unless otherwise stated.

*Example 1*

The following shows the stability of anchor baths containing a typical test melamine-formaldehyde-polyalkylenepolyamine-alkanepolyol resin as anchor agent according to the invention, and further shows the stability of corresponding anchor baths containing the melamine-formaldehyde-polyalkylenepolyamine "parent" resin from which the test resin was prepared. A parent water-soluble cationic thermosetting melamine-formaldehyde-polyalkylenepolyamine resin was prepared as follows. A mixture of 72.2 parts of melamine and 152 parts of 37% formalin was adjusted to pH 7.0 and heated at 90° C. to the "0° C. hydrophobe" point (the point at which a drop of the resin in ice water leaves a milky streak). There was then added 311.2 parts of 37% formalin. The mixture was heated at 65° C. for 20 minutes, 34.3 parts of 3,3'-iminobispropylamine being added over this period. The temperature was raised to 75° C. and 28.1 parts of 32% hydrochloric acid was added over about 12 minutes to adjust the pH to 4.2. The mixture was allowed to react at 55° C. to a viscosity of 450 centipoises. The reaction was arrested by adding 1.2 parts of triethanolamine. The resin syrup obtained was neutralized to pH 7.5 with sodium hydroxide and divided in half. To one half was added 186 parts of 37% aqueous formalin and the mixture cooled to room temperature. The product was a normal unmodified hydrophilic parent melamine-formaldehyde-polyalkylenepolyamine cationic thermosetting resin in stable form, and was labeled as the control.

The remaining half of the batch was divided into five equal portions, and 37 parts of an alkanepolyol was added to each as shown in the table. Each portion was then divided in half, yielding two sets of resin-alkanepolyol syrups. One set of syrup was immediately cooled to room temperature to prevent reaction. This set contained the parent resin in which all of the polyol was in unreacted form. The second set was maintained at 65° C. for three hours, by which time at least part of the alkane polyol had reacted, and then cooled to room temperature. In this set it was known from previous experiences the parent resin was at least partially reacted with the alkanepolyols.

Test anchor baths were prepared by diluting the above-described syrup to 5% resin solids with laboratory deionized water. The comparative stability of 100-cc. portions in the presence of dissolved polyvalent anions was determined by titrating 5% aqueous sodium sulfate solution until substantially complete flocculation of the resin occurred (endpoint constant opacity). Results were as follows:

| Resin | Alkane Polyol Added | Ml. 5% Na$_2$SO$_4$ to Flocculate | |
|---|---|---|---|
| | | Alkanepolyol Unreacted [1] | Alkanepolyol Reacted [2] |
| Control | None | (18.5) | |
| 1 | Ethylene glycol | 19.0 | 250 |
| 2 | Glycerol | 18.7 | 250 |
| 3 | Diethylene glycol | 18.8 | 250 |

[1] Sample maintained at room temperature after addition of the polyol.
[2] Sample heated at 65° C. for 3 hrs. after addition of polyol.

These results indicate that the baths containing the alkane polyol in at least partially reacted form are quite resistant to flocculation by aqueous sodium sulfate, whereas without such reaction the bath possesses very little stability.

*Example 2*

A test was made as follows to determine the effectiveness of the control (parent) resin of Example 1 as anchor agent in comparison with the resin after reaction with ethylene glycol and glycerol as alkanepolyols.

A solution of glycerol in water containing 8% of glycerol by weight was divided into equal portions. One portion was reserved as control, and to this nothing was added. To each of the others was added 0.5% of one of the test resins in the table below. Sheets of wet swollen washed regenerated cellulose film were immersed in the bath for five minutes, wiped dry, drained, clamped to polished chrome plates to prevent shrinkage, dried at 200° F. for 10 minutes, stripped from the plates, topcoated with a standard nitrocellulose lacquer similar to that of U. S. Patent No. 2,394,009, air dried for one hour, and dried at 200° F. for three minutes. Strips were cut from the resulting topcoated films, all edges of the films being freshly cut, and the strips immersed in water at 190° F. Resistance to sloughing was determined by rubbing the films between the fingers from time to time. Results are as follows:

| Resin: | Minutes to slough |
|---|---|
| A (Ex. 1) | >200 |
| Resin A, reacted with glycol | >200 |
| Resin A, reacted with glycerol | >200 |

These results indicate that the step of reacting the resin with a polyol does not seriously impair the properties of cellulose film treated therewith.

*Example 3*

The effect of the alkanepolyol component in accelerating conversion of the treated film to anchored form, ready for application of the topcoat material is illustrated by the following.

One set of regenerated cellulose film was treated with melamine-formaldehyde-iminobispropylamine-glycerol resin according to the general method of Example 1. The anchor bath contained 0.75% by weight of the resin and 8% by weight of added free (unreacted) glycerol as plasticizer. The film was dried at 190° F. for 3 minutes and topcoated with nitrocellulose lacquer as shown in Example 1. The lacquered sheets were air-dried for one hour and then baked as shown in the table below to bring the anchor agent to maximum practical cure and finish drying of the lacquer. The resulting films were then submitted to the standard slough test, resistance to sloughing being known to be an index of the extent to which the resin is cured.

| Resin | Resistance to Sloughing in Water 185° F. After cure at 200° F. For— | | | |
|---|---|---|---|---|
| | 3 min. | 5 min. | 7 min. | 9 min. |
| Parent resin | 142 | 181 | 208 | 234 |
| Do., glycerol reacted | 208 | 240 | 258 | 275 |
| Control (no resin) | 2 | 2 | 2 | 2 |

We claim:
1. A process of treating sulfate-process non-fibrous regenerated cellulose film to improve its anchoring properties, which comprises passing said film through an anchoring bath containing a cationic thermosetting melamine - formaldehyde - polyalkylenepolyamine - alkanepolyol condensation product in hydrophilic form as anchor agent, thereby impregnating said film with said anchor agent, the alkanepolyol in said resin being normally water-soluble and being combined in said resin in minor but effective amount as component inhibiting precipitation of the resin by the action of the sodium sulfate which accumulates in said bath.

2. A process according to claim 1 wherein the dilute aqueous solution of the melamine-formaldehyde-polyalkylenepolyamine-alkanepolyol resin has an alkaline pH.

3. A process according to claim 1 wherein the alkanepolyol is glycerol.

4. A process according to claim 1 wherein the dilute aqueous solution of anchor agent contains between 5% and 15% by weight of unreacted glycerol as plasticizer for said film.

5. A process of treating sulfate process non-fibrous regenerated cellulose film to improve its anchoring properties, which comprises passing said film through an anchoring bath containing a cationic thermosetting hydrophilic melamine - formaldehyde - polyalkylene - polyamine-alkanepolyol condensation product as anchor agent thereby impregnating said film with said anchor agent, the alkanepolyol in said resin being normally water-soluble and non-ionic and being combined in said resin in minor but effective amount as component inhibiting precipitation of the resin by the action of the sodium sulfate which accumulates in said bath, and heating said film at 160°–260° F. until said film is apparently dry.

6. In a process of manufacturing topcoated non-fibrous regenerated cellulose film, wherein a film of viscose solution is delivered into an aqueous sulfuric acid coagulating-regenerating bath, thereby forming non-fibrous regenerated cellulose film in wet swollen gel form containing a small amount of sodium sulfate, said film is washed at least until a sample is clear when apparently dry, said film is heated at 160°–260° F. until apparently dry, and a hydrophobic organic topcoat applied thereto, the improvement which consists in impregnating said wet swollen film with a dilute aqueous solution of a cationic thermosetting hydrophilic melamine-formaldehyde-polyalkylene-polyamine-alkanepolyol condensation product as anchor agent, said alkanepolyol being normally water-soluble and non-ionic and being combined in said resin in minor but effective amount as component inhibiting precipitation of said resin by the sodium sulfate which accumulates in said bath.

References Cited in the file of this patent
UNITED STATES PATENTS
2,796,362   Wooding et al. _____ June 18, 1957